United States Patent [19]

Shuman

[11] 4,018,551
[45] Apr. 19, 1977

[54] TABLE FOR PLASTIC FORMING APPARATUS

[76] Inventor: Jack N. Shuman, 3330 Foxcroft Road, Charlotte, N.C. 28211

[22] Filed: July 28, 1975

[21] Appl. No.: 599,784

[52] U.S. Cl. .............................. 425/388; 269/142; 269/208; 425/DIG. 48

[51] Int. Cl.² ........................................ B29C 17/04

[58] Field of Search ............... 425/388, 193, 451.9, 425/DIG. 48, 383; 269/88, 111, 121, 140, 141, 142, 208

[56] References Cited

UNITED STATES PATENTS

| | | | |
|---|---|---|---|
| 2,836,852 | 6/1958 | Butzko | 425/388 X |
| 3,553,784 | 1/1971 | Shuman | 425/158 |
| 3,599,959 | 8/1971 | Asenbauer | 425/DIG. 48 |
| 3,661,486 | 5/1972 | MacDonald | 425/388 X |
| 3,810,731 | 5/1974 | Anderson | 425/388 |
| 3,841,819 | 10/1974 | Diamond | 425/388 |

Primary Examiner—Robert L. Spicer, Jr.
Attorney, Agent, or Firm—Richards, Shefte & Pinckney

[57] ABSTRACT

A table for use in plastic forming machines, the table including a plurality of upstanding tubular support members arranged in a predetermined pattern, a plurality of alternately usable platform members, each such platform member being of a different size to support different vacuum molds and each being mountable on selected ones of the upstanding tubular supports. A plastic material clamping frame having readily adjustable side elements for varying the size of the clamping frame is arranged to be selectively positionable, at all variable sizes thereof, between selected tubular support members to thereby hold the edges of a sheet of plastic material along and beneath the edges of different vacuum forming molds mounted on a platform member supported by the tubular support members.

13 Claims, 9 Drawing Figures

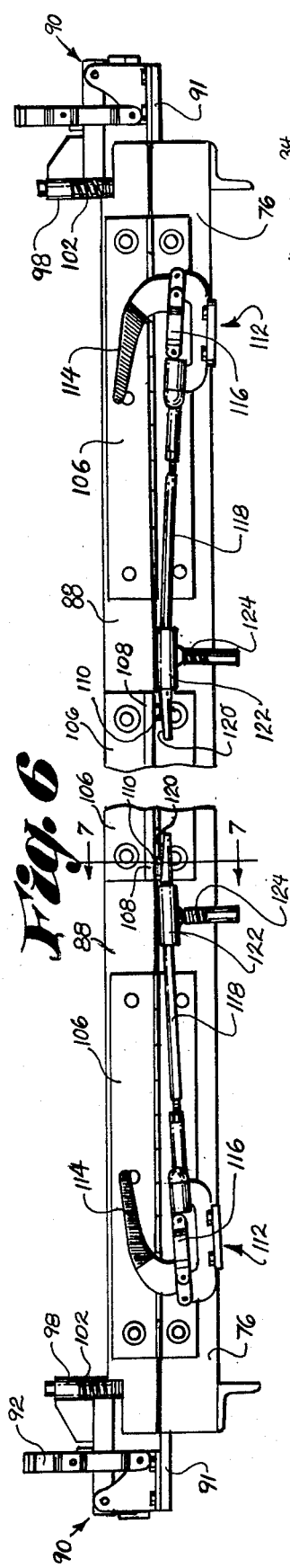

TABLE FOR PLASTIC FORMING APPARATUS

BACKGROUND OF THE INVENTION

There is an increasing demand for formed plastic pieces embodying a particular design which can be used in signs and similar articles, and, quite often, such pieces must be formed in only very limited quantities rather than mass produced. Equipment to form such plastic pieces must be relatively inexpensive to produce and easy to operate by untrained personnel, and it must be versatile enough to permit a large variety of totally different signs to be formed without requiring complicated and time consuming operating procedures.

Equipment is presently available for this purpose, a typical example of which is disclosed in Shuman U.S. Pat. No. 3,553,784, issued Jan. 12, 1971. Generally, this equipment includes an elevated heating oven, and a forming table which supports a vacuum forming mold and a frame arrangement for holding a sheet of plastic material which is melted by the elevated oven until plasticized, whereupon it is drawn by vacuum across the mold so as to conform to the contours thereof.

This equipment has been found to be satisfactory in operation, but it has several practical drawbacks. As noted above, such equipment must be capable of utilizing a variety of molds having different sizes and shapes, and while the equipment disclosed in U.S. Pat. No. 3,553,784, has this capability, it requires a rather significant inventory of relatively expensive mold supporting vacuum boxes, each designed for molds of different sizes, and considerable time is required to change from one mold supporting unit another.

More specifically, since the edges of the plastic sheet to be formed must be pulled down over all edges of the forming mold to assure that all surface contours of the mold are faithfully reproduced in the formed plastic, presently available equipment includes a vacuum box which rests on a reinforced platen, such vacuum box having peripheral dimensions that are similar to the corresponding dimensions of the mold and having vertical side walls which permit the mold to be supported atop the vacuum box while permitting the plastic holding frame to be lowered along the vertical sides of the vacuum box and thereby pull the edges of the plastic sheet to a position beneath the lowermost edges of the elevated mold. While this arrangement operates satisfactorily as indicated above, it will be appreciated that a separate vacuum box is required for each different mold size, and these vacuum boxes, in addition to being expensive to produce because they must be strong enough to withstand the vacuum imposed on the mold, are cumbersome to handle and require considerable storage space because of their dimensions. Moreover, the vacuum source must have a significant capacity because the interior of the forming mold itself, and finally, some difficulty is encountered in locating and fixing the vacuum box in place on the platen so that it will be properly oriented when the plastic holding frame is lowered thereabout. For example, it is common practice to use masking tape to hold the vacuum box in place, but masking tape is both expensive and time consuming to use.

Additionally, since the plastic holding frame must be capable of use with a variety of different mold sizes, it must have sides which can be adjusted to vary the size of the frame so that it will conform generally with the peripheral dimensions of the different molds. Heretofore, the four frame sides have been bolted together at selected points along the lengths thereof, and this arrangement required a considerable amount of time consuming labor to unbolt and rebolt all four sides each time the dimensions of the frame were altered to fit a particular mold.

In accordance with the present invention, a unique forming table and adjustable plastic holding frame are provided which eliminate the aforementioned drawbacks of existing plastic forming equipment.

SUMMARY OF THE INVENTION

The present invention includes a forming table having a central area in which a plurality of support members are arranged in a predetermined pattern spaced from one another with the upper ends of the support members lying in a common plane, and a selectively removable platform member having means for engaging selected ones of the aforesaid support members at the upper ends thereof to support a vacuum forming mold thereat, the platform member including means for connecting the interior of the vacuum forming mold directly to a vacuum source. A clamping frame is provided which has selectively adjustable side elements for varying the effective size of the clamping frame, and which has clamping means for engaging the side edges of a sheet of plastic material, the clamping frame being selectively positionable in the central area of the forming table with the adjustable side elements thereof located between predetermined ones of the tubular support member to hold the side edges of the plastic sheet along and beneath the edges of the vacuum mold supported by the platform member. By virtue of this arrangement, the previously discussed vacuum boxes are eliminated, and are replaced by smaller, less expensive platform members that can be quickly mounted on the forming table at a precise location thereon, while still permitting the adjustable clamping frame to pull the edges of the plastic material down beneath the edges of the vacuum forming mold.

Preferably, the support members are tubular, and each row of tubular support members is carried in a self-contained bracket which facilitates the mounting of the support members in the forming table. Also, each different platform member that issued with the forming table to support molds of different sizes preferably includes projections at the corner thereof, such projections being arranged to fit within selected support members to thereby locate the platform members on the forming table and hold them in place thereat. Each platform member may also include a quick-connect coupling extending therethrough for engaging a vacuum hose and imposing a vacuum at the interior of the vacuum forming mold supported thereby.

The aforementioned clamping frame preferably includes a pair of spaced base members with a first pair of side elements arranged in spaced parallel relation and selectively positionable on the base members to vary the spacing therebetween, and a second pair of side elements extending in spaced parallel relation between the first pair of side elements in perpendicular relation thereto, the second pair of side elements engaging the first pair of side elements at a plurality of locations therealong whereby the spacing between the second pair of side elements may be selectively varied. The base members may include spaced apertures therealong whereby the first pair of side elements can be connected endwise to the base members by a single bolt at each end of each first side element, and the first pair of side elements may be formed with spaced slots in the facing side walls thereof for engagement with tongues projecting from the ends of the second pair of side elements.

It is to be noted also the location and spacing of the apertures in the frame base member, and the location and spacing of the slots in the first pair of side elements, have a predetermined relationship with the pattern of the upstanding support members, to assure that the frame member side elements, at all adjusted positions thereof, will be located between the support members when the clamping frame is lowered to a position beneath the lowermost edges of the vacuum forming mold.

BRIEF DESCRIPTION OF THE DRAWINGS

FIG. 6 is a rear elevational view of the clamping frame illustrated in FIG. 4;

FIG. 8 is a sectional view taken at the center of the platform member and vacuum forming mold supported thereby; and FIG. 9 is a detail view illustrating the mounting for the upstanding support members in the forming table.

DESCRIPTION OF THE PREFERRED EMBODIMENT

Figure 1:
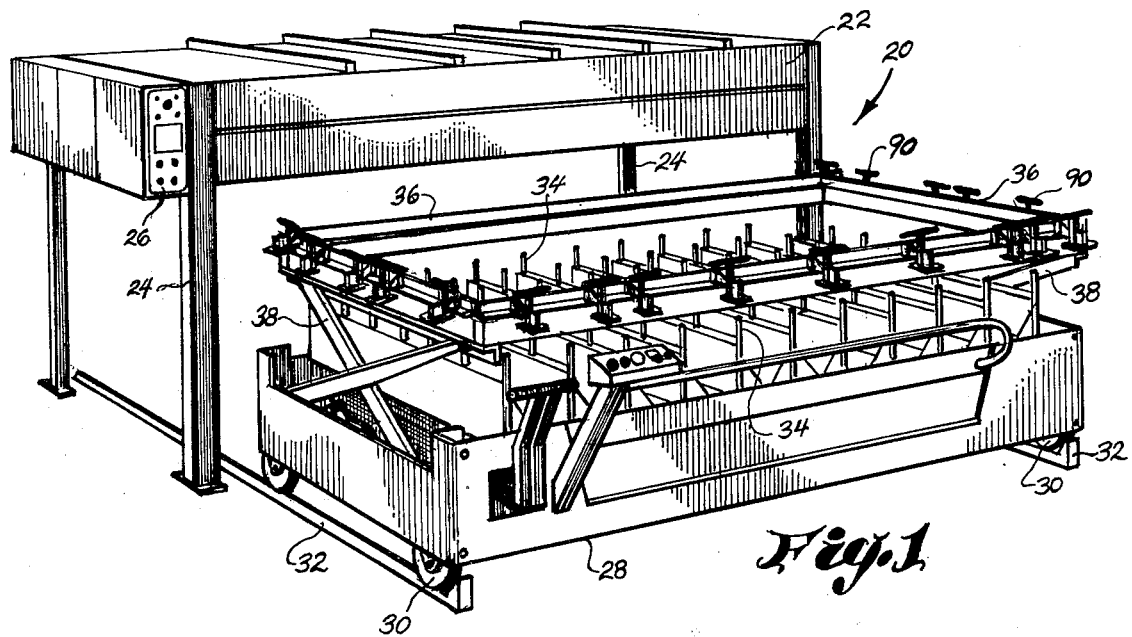
FIG. 1 is a perspective view of apparatus for forming plastic material embodying the present invention.

Looking now in greater detail at the accompanying drawings, FIG. 1 illustrates apparatus for forming plastic material, generally indicated by the reference number 20, comprising a heating oven 22 supported at an elevated position by vertical legs 24, the bottom side of the heating oven 22 including a plurality of heating panels (not shown) operated by a control unit 26 to energize selected heating panels and thereby create selected zones of heating beneath the heating oven 22, all as explained in greater detail in the aforementioned U.S. Pat. No. 3,553,784.

A forming table 28 is mounted on casters 30 disposed on tracks 32 to permit the forming table 28 to be rolled from a position directly beneath the heating oven 22 to a position displaced therefrom as illustrated in FIG. 1 at which the forming mold and plastic sheet to be formed can be mounted on the forming table 28 as will be explained in greater detail presently.

The forming table 28 includes a central area or bed having a plurality of upstanding support members 34 arranged in a predetermined pattern spaced from one another with the upper ends of the support members 34 lying in a common horizontal plane. The forming table 28 also includes a rectangularly shaped clamping frame 36 supported for vertical movement by scissor-type linkages 38 which are selectively operated by an electric motor (not shown) to raise and lower the clamping frame 36, as explained in greater detail in the aforementioned U.S. Pat. No. 3,553,784.

Figure 2:
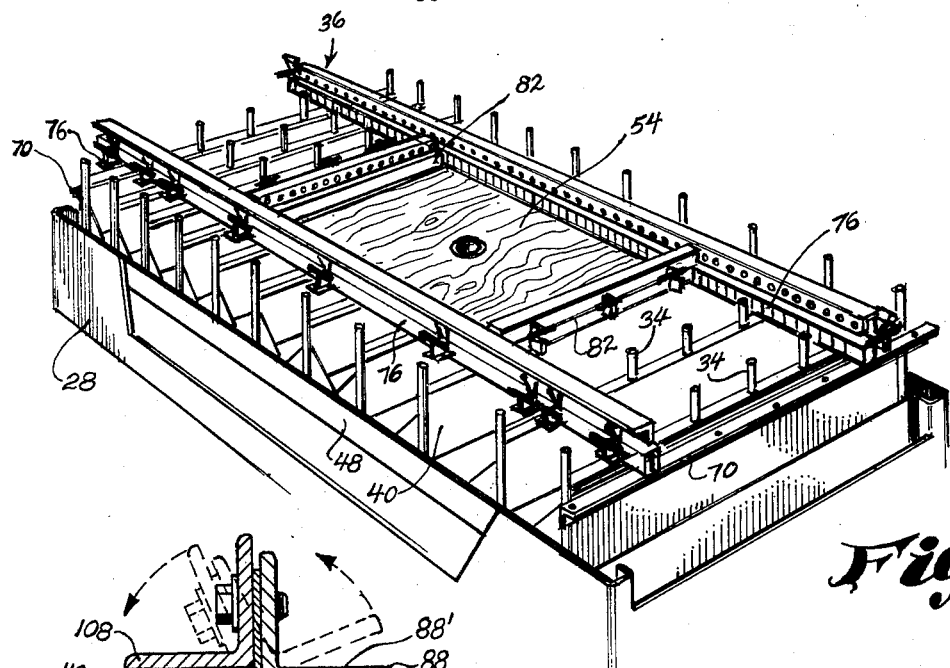
FIG. 2 is a perspective view of the forming table of apparatus shown in FIG. 1.

As best seen in FIGS. 2 and 9, the upstanding support members 34 are tubular in form, and they are supported in parallel rows with each row arranged in a self-contained bracket member 40 having a vertical wall 42, a bottom wall 44 and a horizontally extending flange 46 formed with openings 46' spaced at predetermined intervals therealong to receive and support the upstanding support members 34 at a vertical disposition with the bottom ends of the support member 34 being welded to the bottom wall 44 and with the upper ends of support members 34 extending above the horizontal flange 46. One or more of the support members 34 may have reinforcing struts extending therefrom to the bottom wall 44 to augment the structural integrity of the bracket members 40. It will be noted that each bracket 40, with its support members 34, is a self-contained unit which may be assembled separately and then conveniently mounted in the forming table 28 by welding or otherwise securing the ends of the bracket member 40 to the side walls 48 of the forming table, and each bracket bottom wall 40 may have an upturned flange 50 located at a predetermined spacing from the vertical wall 42 whereby adjacent bracket members 40 may also be secured to one another by welds 52 for increasing the strength of the forming table and locating the rows of upstanding support members 34 at selected spacings represented by the width of the bottom walls 44. It will also be noted that when all of the bracket members 40 are mounted in place in the forming table 28, the vertically upstanding support members 34 are arranged in rows which extend in parallel relation to the width and length of the forming table 28 with the upper ends thereof being unencumbered and having the end faces thereof located in a common horizontal plane. By selecting the spacing between the openings 46', and by selecting the widths of the bracket member bottom walls 44, the upstanding support members 34 are disposed in a predetermined pattern.

Figure 3:
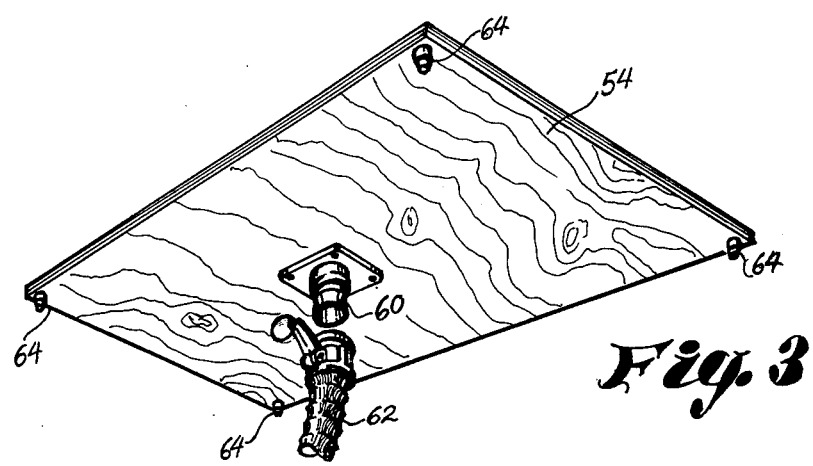
FIG. 3 is a perspective view illustrating the bottom of a platform member.

A typical platform member 54 used in the present invention is illustrated in FIGS. 2, 3 and 8, such platform member 54 preferably being formed from a flat plywood board having a rectangular shape. The platform member 54 has mounted at the center thereof a quick-connect coupling 60 adjacent a center opening 58 in the platform member 54 for selective connection with a vacuum hose 62 extending from a convenient vacuum source (not shown). The platform member 54 has fixed thereto at each corner of the bottom surface thereof a projection 64 having a generally conical shape and arranged to be received within the open upper end of a tubular support member 34, and, if desired, one or more of the tubular support members 34 may be provided with set screws 66 (see FIG. 8) to positively engage the projections 64.

As described above, the upstanding support members 34 are arranged in a known, predetermined pattern extending along rectangular coordinates, and the spacing between the upstanding members 34 is generally selected to assure that they will be positioned in groups of four corresponding to the corner spacing between a number of rectangular platform members 54 having various sizes selected to support a wide variety of different vacuum forming molds 18, one of which is shown supported by the platform member 54 in FIG. 8 and secured thereto in any suitable manner. Thus, a large number of platform members 54 having various sizes are used alternatively with the forming table 28, each such platform member 54 having a size which enables it to properly support a forming mold 68 of a particular size, and the predetermined pattern of the upstanding support members 34 is such that the entire inventory of platform members 54 used with the apparatus 10 will be supportable at four or more preselected upstanding support members 34.

The aforementioned clamping frame 36 includes a pair of base members 70 extending along the sides of the forming table 28 so as to be in spaced, parallel relation to one another beyond the outermost rows of upstanding support members 34, and each of these base members 70 is fixed to one of the linkages 38 (see FIG. 1) to be raised and lowered thereby. Each base member 70 is formed with a horizontal flange 72 having a plurality of apertures 74 located at preselected spaced intervals therealong, and a first pair of side elements 76 are mounted endwise in the base members 70 by a single bolt 78 at each end of each side element 76 engaging the base member 70 at one of the apertures 74 thereof whereby the first pair of side elements 76 extend in spaced parallel relation to one another. It will be apparent that spacing between the first pair of side elements 76 may be selectively varied by simply disconnecting the four bolts 78 and positioning one or both of the side elements 76 at other apertures 74 along the base members 70, and then reconnecting the bolts 78 in place thereat. If desired, the base members may be provided with longitudinal slots rather than apertures 74, and the bottom end of the bolts 78 could move within such slots with nut members provided to positively hold the bolts in place at any adjusted position along such slots.

Figure 4:
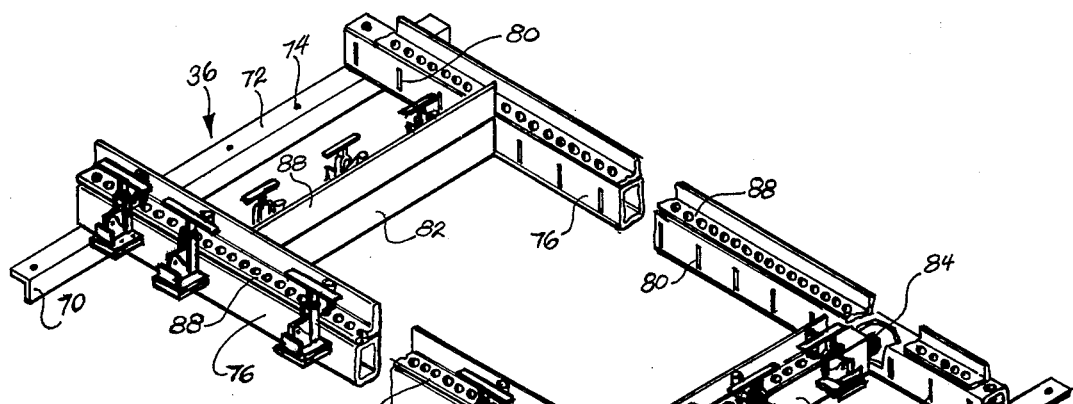
FIG. 4 is a perspective view of the clamping frame of the present invention.

The facing sides of the first pair of side elements 76 are formed with a plurality of vertical slots 80 located in selectively spaced relation along the extending length thereof (see FIGS. 4 and 5), and the clamping frame 36 includes a second pair of side elements 82, each having projecting tongue elements 84 extending from each end thereof for engaging oppositely located slots 80 in the first pair of side elements 76 so as to be held thereby in spaced, parallel relation to one another and in perpendicular relation to the first pair of side elements 76 to form a rectangular opening. The slots 80 and the tongue elements 84 may be of any convenient shape. It will be noted that the same first pair of side elements 76 may be used for all adjusted sizes of the clamping frame 36, and that a plurality of second pairs of side elements 82 are needed, each pair corresponding in length to the spacing between the first pair of side elements 76 at each different adjusted position thereof. By virtue of this arrangement, the four sides of the clamping frame 36 are selectively adjustable to vary the size of the rectangular area formed thereby, and such selective adjustment may be readily accomplished by simply changing the four bolts 78 to change the spacing between the first pair of side elements 76 and by placing the appropriate second pair of side elements 82 within the correct slots 80.

Figure 5:
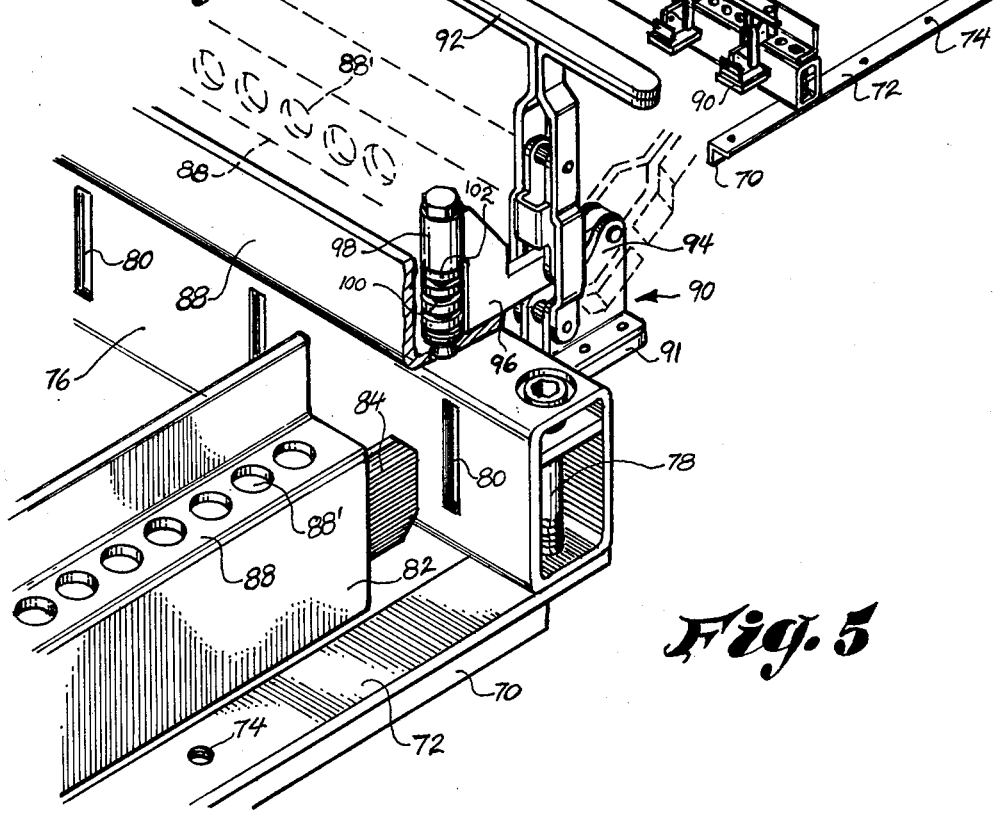
FIG. 5 is a detail view of a corner of the clamping frame illustrated in FIG. 4.

To hold a piece of plastic material 86 in place at the rectangular opening of the clamping frame 36, the first and second pairs of side elements 76 and 82 are each provided with clamping plates 88 arranged in abutting relation with the top surfaces thereof to hold the side edges 86' of the plastic sheet 86 therebetween as illustrated in FIG. 8. Each of the clamping plates includes a plurality of relatively large apertures 88' positioned along the length thereof to permit heat to reach the edges 86' of the plastic sheet 86 as will be explained in greater detail below. The clamping plates 88 for the second pair of side elements 82 and for the front one of the first pair of side elements 76 are mounted on a plurality of clamping devices 90 as best illustrated in FIG. 5. The clamping devices 90 are fixed to flanges 91 secured to one of the side elements, and they include a pivotal operating handle 92 connected through a pivot link 94 to an extending arm member 96 which includes a bearing portion 98 in which a rod 100 is slidably carried, the lower end of the rod 100 being secured to the clamping plate 88. A helical spring 102 acts between the lower face of the bearing portion 98 and the upper surface of the clamping plate 88.

To clamp an edge 86' of a plastic sheet 86 in place in the clamping frame 36, the operating handles of all clamping devices 90 are pivoted outwardly to a position shown in dotted lines in FIG. 5, whereupon the pivot link 94 will cause the arm member 96 to pivot upwardly and carry the clamping plate 96 to its dotted line position spaced from the upper surface of the clamping frame side element as illustrated in dotted lines in FIG. 5. An edge 86' of the plastic sheet 86 may then be laid along the upper surface of the clamping frame side element, and the handle is pivoted to its full line position to cause the clamping plate 88 to hold the plastic sheet edge 86' against the side element. To assure that the plastic sheet edge 86' is positively held in place, the bottom face of the clamping plate 88 may include a plurality of projections 104 spaced along the extending length thereof to engage the plastic sheet edge 86', and the linkage of the clamping device 90 is arranged to cause the bearing portion 98 to slide slightly with respect to the rod 100 when the handle 92 is located at its upright position to thereby press against the spring 102 and impose a downwardly directed compressive force against the clamping plate 88 through the spring 102.

As indicated above, the clamping plates 88 for both of the second pair of side elements 82 and for the front one of the first pair of side elements 76 are operarted by the clamping devices 90 as described above. However, looking at FIG. 1, it will be observed that the rear one of the first pair of side elements 76 is located very near the elevated heating oven 22, even when the forming table 28 is rolled to its displaced position as shown in FIG. 1. Because of this close proximity of the rear side element 76 to the heating oven 22, it would be uncomfortable and perhaps dangerous for operating personnel to operate a plurality of clamping devices 90 if they were disposed along the extending length of the rear side element 76.

Figure 7:
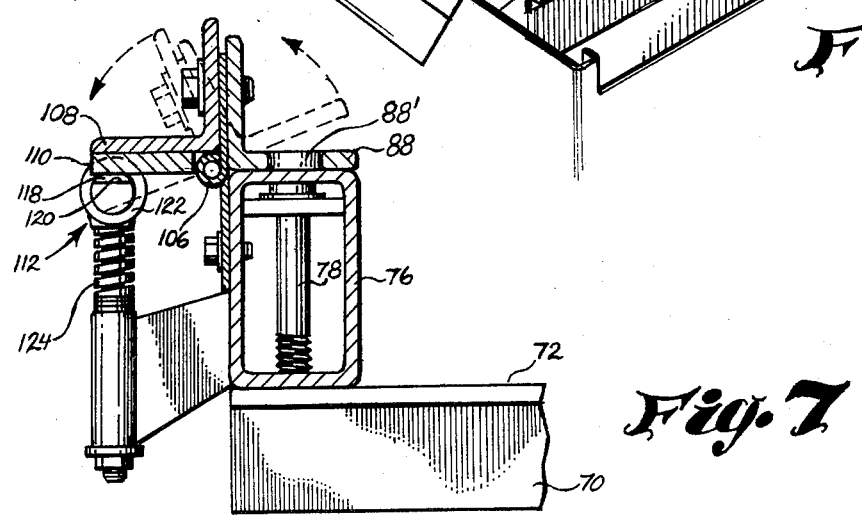
FIG. 7 is a sectional view taken along line 7—7 in FIG. 6.

Accordingly, the present invention provides an arrangement for operating the clamping plate 88 for the rear side element 76 from a remote position at which the operator will not be beneath the heating oven 22. As best seen in FIGS. 6 and 7, the clamping plate 88 for the rear side element 76 is mounted thereon by a hinge 106 for pivotal movement between a clamping position abutting the top surface of the rear side element 76 as shown in full lines in FIG. 7 and an open or raised position to receive the plastic sheet edge 86' as shown in dotted lines in FIG. 7. A clamping force is exerted on the ends of the clamping plate 88 by a clamping device 90 as described above except that the rod 100 thereof is in abutment with the clamping plate 88 rather than being attached thereto. A horizontal flange element 108 is secured to the back of the clamping plate 88 adjacent the longitudinal center portion thereof, and this flange element 108 has attached thereto spaced bearing pieces 110. A remote clamping device 112 is secured adjacent each of the extending ends of the rear side piece 76, and each remote clamping device 112 includes a pivoted handle 114, a connecting linkage 116, and an extending rod member 118 having a sloped surface 120 at the extending end thereof which is in sliding engagement with the bearing piece 110 fixed to the horizontal flange 108, the rod member 118 being slidably carried in a tubular support 122 fixed to the upper end of a stationary coil spring 124 fixed to the rear side element 76.

The operation of both of the remote clamping devices 112 is identical. Looking at remote clamping device 112 shown at the left of FIG. 6, it will be apparent that when the handle 114 is pivoted in a clockwise direction the linkage 116 will cause the rod 118 to move toward the right, whereupon the slopped end surface 120 thereof acts as a wedge to force the bearing piece 110 and flange 108 upwardly and thereby pivot the clamping plate 88 about the hinge 106 into positive abutment with the top surface of the rear side element 76. The coil spring 124 acts in an upward direction to impose a cushioning bias against the rod 118 as it urges the clamping plate 88 into abutment with the rear side element 76. Thus, an operator can stand at the sides of the forming table and pivot the handles 114 of the two remote clamping devices 112 and cause a holding bias to be imposed on the clamping plate 88 at the rear side element 76 adjacent the center thereof.

To use the apparatus 10 described above, the forming table 28 is rolled to its displaced position, and the linkages 38 are operated to raise the clamping frame 36 to a position above the upper ends of the upstanding support members 34 as shown in FIG. 1. Depending on the size of the particular forming mold 68 to be used, the operator then selects a platform member 54 having dimensions corresponding to the dimensions of such forming mold, connects the vacuum hose 62 to the quick-connect coupling 60 beneath the selected platform member 54, and places this platform member 54 on the upstanding support elements 34 with the projections 64 depending from the corners of the platform member 54 being fitted within four selected upstanding support elements 34 that are properly spaced from one another in accordance with the dimensions of the platform member 54. With the platform member 54 and mold 68 supported in place, the clamping frame 36 is then adjusted to form a rectangular area slightly larger than the rectangular area of the platform member 54, this being done by selectively locating the first pair of side elements 76 along the base members 70 to obtain desired spacing therebetween, and then mounting a second pair of side members 82 of proper length between the first pair of side members 76 at the proper vertical slots 80 therein.

After a proper sized rectangular opening is formed in the clamping frame, all of the clamping plates 88 at each of the four clamping frame sides are pivoted to their open position, and the side edges 86' of an appropriately dimensioned sheet of plastic material 86 are inserted between the clamping plates 88 and the side elements 76, 82, whereupon the clamping elements 88 are pivoted to their clamping positions to hold the plastic material 86 in place across the rectangular opening of the clamping frame 36. The linkages 38 are then operated again to raise the clamping frame 36 to a predetermined elevation slightly less than the elevation of heating oven 22, and the forming table 28 is rolled to a position directly beneath the heating oven 22 which is then energized by control unit 26 to generate a sufficient quantity of heat to cause the plastic sheet 86 to become plasticized. It will be noted that even though the edges 86' of the plastic sheet 86 are covered by the clamping plates 88, the apertures 88' permit heat to penetrate easily to the edges 86' and cause an even plasticization of the entire sheet 86. The linkages 38 are then operated immediately to lower the clamping frame 36 to its lowermost position beneath the lowermost edges of the forming mold 68 as shown in FIG. 8 whereby the plastic sheet 86 is drawn over the forming mold 68 and caused to conform closely to the contour thereof by the vacuum imposed within the mold 68 from the vacuum hose 62, the mold 68 being formed with a plurality of apertures 126 which permit the vacuum to draw the plastic sheet 86 closely around the contours of the mold 68. The forming table 28 is then preferably moved to its displaced position, and the plastic sheet is allowed to cool after which it is removed by releasing the clamping plates 88.

As noted above, the plurality of upstanding support members 34 are arranged in a predetermined pattern determined by the spacing between the openings 46' in the flanges 46 and by the spacing between the rows of support members 34 as determined by the length of the bottom walls 44 of the bracket members 40. With this predetermined pattern for the upstanding support members 34, the location and spacing of the apertures 74 in the base members 70, and the location and spacing of the slots 80 in first pair of side elements 76, can be arranged to have a predetermined relationship with the pattern of the support members 34 to assure that the clamping frame side elements, at all adjusted positions thereof, will be located between the rows of the support members 34 when the clamping frame is lowered to a position beneath the edges of the mold 68, as shown in FIG. 8.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:
1. Apparatus for use in forming plastic material into predetermined configurations, said apparatus comprising a forming table including a central area having a plurality of upstanding support members arranged in a predetermined pattern spaced from one another, a selectively removable platform member formed with means for engaging the upstanding ends of predetermined ones of said support members whereby said platform member will be supported on said support members, said platform member being adapted to have mounted thereon a vacuum forming mold and including means for connecting the interior of said vacuum forming mold to a vacuum source, and a clamping frame having selectively adjustable side elements for varying the size of said clamping frame and having clamping means for engaging the side edges of a sheet of said plastic material, said clamping frame being selectively positionable in said central area of said forming table with said adjustable side elements located between predetermined ones of said tubular support members to hold said side edges of said plastic sheet along and beneath the lowermost edges of said vacuum forming mold supported by said platform member.

2. Apparatus for use in forming plastic material is defined in claim 1, and further characterized in that said means for connecting said platform member to a vacuum source includes a quick-connect coupling for engaging a vacuum hose.

3. Apparatus for use in forming plastic material as defined in claim 1 and further characterized in that said upstanding support members are mounted in said forming table in parallel rows with each row of support members arranged in a self-contained bracket having a bottom wall and a flange spaced therefrom and including apertures through which said support members extend to said bottom wall whereby said support members are held at an upstanding disposition.

4. Apparatus for use in forming plastic material as defined in claim 1, and further characterized in that said upstanding support members are tubular, and in that said platform member engaging means comprises projections constructed and arranged to fit within said tubular support members for engagement thereby.

5. Apparatus for use in forming plastic material as defined in claim 4, and further characterized in that said upstanding support members are arranged in spaced parallel lines with a predetermined spacing between each said upstanding support member in each said line, in that said platform member is rectangular in shape with four corners thereof corresponding to the spacing of a preselected four of said upstanding support members, and in that said platform member includes one of said projections at each said corner thereof.

6. Apparatus for use in forming plastic material as defined in claim 1, and further characterized in that said clamping frame includes base means, a first pair of side elements arranged in spaced parallel relation and selectively positionable on said base member means to vary the spacing therebetween, and a second pair of side elements extending in spaced parallel relation between said first pair of side elements in perpendicular relation thereto, said second pair of side elements including means for engaging said first pair of side elements at a plurality of locations therealong whereby the spacing between said second pair of side elements may be selectively varied.

7. Apparatus for use in forming plastic material as defined in claim 6 and further characterized in that said clamping frame base means is positioned beyond the limits of said central area of said forming table, and in that said clamping frame includes means for selectively moving said base means between positions at which said side elements of said clamping frame are disposed above and beneath said lowermost edges of said vacuum forming mold, whereby said side elements can be selectively positioned at a location above said support members to engage a plastic sheet of predetermined size and then lowered to a position between said support members and beneath said lowermost edges of said vacuum forming mold supported by said platform member.

8. Apparatus for use in forming plastic material as defined in claim 6 and further characterized in that said base means includes a pair of spaced parallel base members formed with a plurality of apertures spaced therealong, and in that the ends of said first pair of side elements include bolts therein for engaging selected ones of said apertures in said base members.

9. Apparatus for use in forming plastic material as defined in claim 8 and further characterized in that said first pair of side elements include a plurality of spaced slots formed in the facing side faces thereof, and in that said second pair of side elements are formed with tongue portions at the ends thereof for engaging said slots in said first pair of side elements.

10. Apparatus for use in forming plastic material as defined in claim 9 and further characterized in that said apertures in said clamping frame base member and said slots formed in said clamping frame side elements are located in predetermined relationship with respect to said pattern of said upstanding support members to assure that said clamping frame side elements, at all adjusted positions thereof, will be located between said upstanding support members when said clamping frame is positioned beneath said lowermost edges of said vacuum forming mold.

11. Apparatus for use in forming plastic material as defined in claim 1 and further characterized in that said clamping means includes clamping plates mounted for selective movement between a first position spaced from said clamping frame side elements to permit the insertion of said plastic sheet material edges therebetween and a second position abutting said clamping frame side elements to hold said plastic sheet material edges therebetween, said clamping plates being formed with a plurality of openings therein to permit heat to reach said plastic sheet material edges at said second position of said clamping plates.

12. Apparatus for use in forming plastic material as defined in claim 11, and further characterized in that said clamping plates are pivotably mounted on said clamping frame side elements, and in that selectively operable spring bias clamping devices are arranged to move said clamping plates between said first and second positions thereof and to impose a clamping force on said clamping plates at said second position thereof.

13. Apparatus for use in forming plastic material as defined in claim 11 and further characterized in that said clamping frame includes four of said side elements arranged to form a rectangle, and in that said clamping means for at least one of said side elements includes at least one remote clamping device means having operating means located adjacent one end of said one side element and having means for imposing a clamping force on said clamping plate for said one side element at a point adjacent the center thereof.

* * * * *